(12) United States Patent
Sinclair et al.

(10) Patent No.: US 6,879,930 B2
(45) Date of Patent: Apr. 12, 2005

(54) CAPACITANCE TOUCH SLIDER

(75) Inventors: Michael J. Sinclair, Kirkland, WA (US); Kenneth P. Hinckley, Seattle, WA (US); James T. Kajiya, Duvall, WA (US); Nathan C. Sherman, Sammamish, WA (US)

(73) Assignee: Microsoft Corporation, Redmond, WA (US)

(*) Notice: Subject to any disclaimer, the term of this patent is extended or adjusted under 35 U.S.C. 154(b) by 378 days.

(21) Appl. No.: 09/820,747

(22) Filed: Mar. 30, 2001

(65) Prior Publication Data

US 2003/0028346 A1 Feb. 6, 2003

(51) Int. Cl.$^7$ .......................... G01C 17/90; G01C 19/00
(52) U.S. Cl. ............................................... 702/150
(58) Field of Search .............................. 702/150, 138; 345/173, 174, 157; 341/33, 34, 20; 179/18.01, 18.06, 19.07, 20.04

(56) References Cited

U.S. PATENT DOCUMENTS

| | | | | |
|---|---|---|---|---|
| 3,696,409 A | * | 10/1972 | Braaten | 341/26 |
| 4,103,252 A | * | 7/1978 | Bobick | 331/48 |
| 4,264,903 A | * | 4/1981 | Bigelow | 341/1 |
| 4,323,829 A | * | 4/1982 | Witney et al. | 318/55 |
| 4,353,552 A | * | 10/1982 | Pepper, Jr. | 463/37 |
| 4,374,381 A | * | 2/1983 | Ng et al. | 345/173 |
| 4,550,221 A | * | 10/1985 | Mabusth | 178/18.06 |
| 4,550,310 A | * | 10/1985 | Yamaguchi et al. | 307/99 |
| 4,686,332 A | * | 8/1987 | Greanias et al. | 345/173 |
| 4,736,191 A | | 4/1988 | Matzke et al. | |
| 4,771,138 A | * | 9/1988 | Dhawan | 178/18.03 |
| 4,831,566 A | * | 5/1989 | Matthews et al. | 702/95 |
| 4,857,684 A | * | 8/1989 | Gratke | 200/600 |
| 4,879,461 A | | 11/1989 | Philipp | |
| 5,008,497 A | * | 4/1991 | Asher | 178/18.05 |
| 5,053,757 A | * | 10/1991 | Meadows | 345/173 |
| 5,124,509 A | * | 6/1992 | Hoendervoogt et al. | 178/20.04 |
| 5,305,017 A | * | 4/1994 | Gerpheide | 345/174 |
| 5,369,227 A | * | 11/1994 | Stone | 178/19.07 |
| 5,386,219 A | * | 1/1995 | Greanias et al. | 345/174 |
| 5,463,388 A | * | 10/1995 | Boie et al. | 341/33 |
| 5,488,204 A | * | 1/1996 | Mead et al. | 178/18.06 |
| 5,543,588 A | * | 8/1996 | Bisset et al. | 178/18.06 |
| 5,565,658 A | * | 10/1996 | Gerpheide et al. | 178/18.02 |
| 5,572,205 A | | 11/1996 | Caldwell et al. | |

(Continued)

FOREIGN PATENT DOCUMENTS

| | | |
|---|---|---|
| WO | WO 98/05025 | 2/1998 |
| WO | WO 00/44018 | 7/2000 |

OTHER PUBLICATIONS

"The Charge Transfer Sensor A New Class of Sensor Uses Spread Spectrum Signals To Make Ordinary Objects Proximity Sensitive", Kavlico Corporation, Sensors, Oct. 1999, http://www.sensormag.com/articles/hot1099/main.shtml.

(Continued)

*Primary Examiner*—John Barlow
*Assistant Examiner*—Demetrius Pretlow
(74) *Attorney, Agent, or Firm*—Banner & Witcoff, Ltd.

(57) ABSTRACT

A device for detecting the position of a human finger or other object on a touch-sensitive scrolling pad. Dual independent oscillators may be used to generate two pulse trains at frequencies dependent upon the capacitance of two conductors resulting from the position of the finger on the conductors. The pulses from each oscillator may be counted over a time interval. A ratio-metric measurement may be taken by calculating the ratio of the two counts, and a sum may also be calculated. The ratio of the two counts relates to finger position on the device, and their sum relates to finger pressure upon the device.

18 Claims, 5 Drawing Sheets

U.S. PATENT DOCUMENTS

| | | | | |
|---|---|---|---|---|
| 5,638,092 | A | * | 6/1997 | Eng et al. .................... 345/158 |
| 5,670,988 | A | * | 9/1997 | Tickle ......................... 345/157 |
| 5,730,165 | A | | 3/1998 | Philipp |
| 5,771,037 | A | * | 6/1998 | Jackson ....................... 345/157 |
| 5,790,107 | A | * | 8/1998 | Kasser et al. ................ 345/174 |
| 5,796,183 | A | * | 8/1998 | Hourmand .................. 307/116 |
| 5,847,690 | A | * | 12/1998 | Boie et al. ................... 345/104 |
| 5,854,625 | A | * | 12/1998 | Frisch et al. ................. 345/173 |
| 5,861,875 | A | * | 1/1999 | Gerpheide .................... 345/174 |
| 5,933,102 | A | * | 8/1999 | Miller et al. .................... 341/33 |
| 5,943,044 | A | * | 8/1999 | Martinelli et al. ........... 345/174 |
| 5,945,979 | A | * | 8/1999 | Rutledge et al. ............. 345/161 |
| 5,988,902 | A | * | 11/1999 | Holehan .................. 400/479.1 |
| 6,075,522 | A | | 6/2000 | Milroy |
| 6,084,570 | A | | 7/2000 | Milroy |
| 6,147,680 | A | * | 11/2000 | Tareev ......................... 345/173 |
| 6,222,524 | B1 | * | 4/2001 | Salem et al. ................. 345/157 |
| 6,222,528 | B1 | * | 4/2001 | Gerpheide et al. ........... 345/173 |
| 6,288,707 | B1 | * | 9/2001 | Philipp ........................ 345/168 |
| 6,414,671 | B1 | * | 7/2002 | Gillespie et al. ............. 345/157 |
| 6,587,093 | B1 | * | 7/2003 | Shaw et al. .................. 345/163 |
| 6,642,857 | B1 | * | 11/2003 | Schediwy et al. ............. 341/20 |
| 2001/0006383 | A1 | * | 7/2001 | Fleck et al. .................. 345/179 |
| 2001/0048589 | A1 | * | 12/2001 | Brandenberg et al. ....... 361/683 |

OTHER PUBLICATIONS

Larry K. Baxter, Capacitive Sensors, Design and Applications, IEE Press, 1997, pp. 39–42, 49–53, 81, 82, 91, 104, 139, 165–167.

Synaptics webpage, http://www.synaptics.com/technology/cps.cfm, printed Apr. 09, 2001, 2 pages.

Synaptics webpage, http://www.synaptics.com/technology/cfs.cfm, printed Apr. 09, 2001, 2 pages.

Synaptics webpage, http://www.synaptics.com/technology/tcps.cfm, printed Apr. 09, 2001, 2 pages.

* cited by examiner

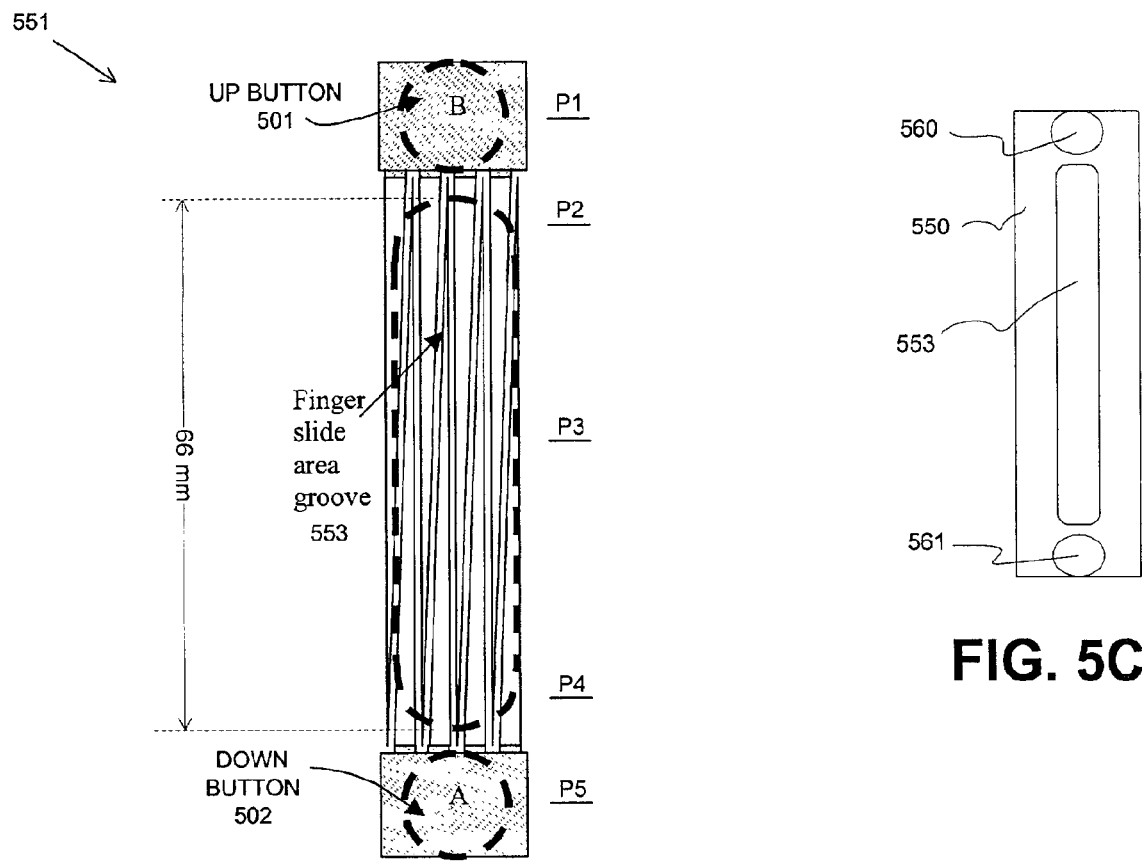
FIG. 5A
FIG. 5C
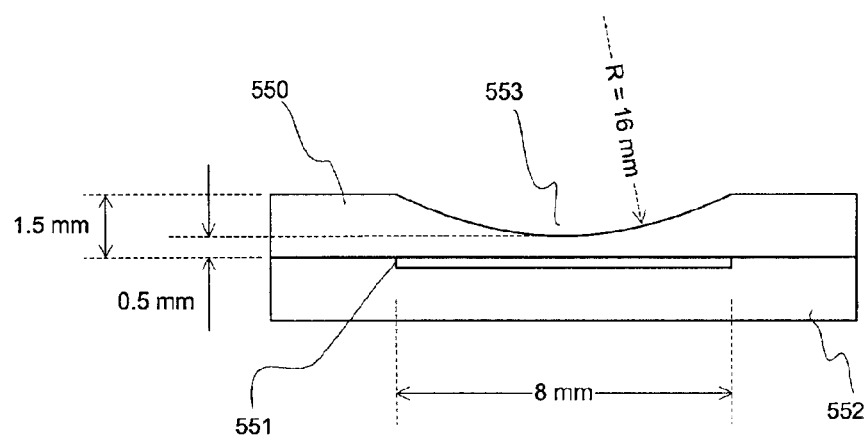
FIG. 5B

CAPACITANCE TOUCH SLIDER

FIELD OF THE INVENTION

The present invention is directed generally to touch-sensitive pads and associated devices, and more particularly to capacitance touch sliders and methods for detection of the position of a pointing member thereon.

BACKGROUND OF THE INVENTION

Personal computers and other similar devices have a multitude of possibilities for providing user input. For instance, most computers today are used in conjunction with a mouse or similar pointing device for controlling the position of a cursor on a display. The mouse is also often used for scrolling in, e.g., word processing applications or other similar applications.

However, the mouse is not always an optimal device for controlling scrolling. Although some mice have scroll wheels, these wheels are also not ideal for some users, as they require substantial manual dexterity to be able to control the mouse, mouse wheel, and mouse buttons simultaneously. Another reason a mouse is not necessarily optimal for scrolling is that it requires a user who is typing on a keyboard to remove one of his or her hands from the keyboard to the mouse, and then back to the keyboard to continue typing.

There is therefore a need for an alternative device for controlling scrolling. To address the above problems, others have attempted to provide scrolling via the use of a two-dimensional touch pad such as that found on a typical laptop computer. For instance, the user can scroll by dragging a finger along an edge of the touch pad. However, the two-dimensional touch pad is not always convenient because of the tendency to not be able to place the finger accurately on the edge of the touch pad. Further, inaccurate touching of the touch pad will move the cursor instead of scrolling, causing frustration to the user.

There is also a need for a better way to sense the position of a finger on a touch sensitive position sensor that corrects for common-mode errors such as variations in finger pressure, fingertip size, moistness of the finger caused by hand lotion, and other factors.

SUMMARY OF THE INVENTION

An aspect of the present invention is directed to a device for detecting the position of a pointing member such as a human finger or other object on a touch-sensitive scrolling pad. The device may include a frequency ratio determinator, such as in the form of an electronic circuit, coupled to an arrangement of capacitive nodes such as conductive plates and/or conductive traces of a printed circuit board. The frequency ratio determinator may include dual independent oscillators used to generate pulses at frequencies dependent upon the capacitance of the conductors resulting from the position of the finger on the conductors. The frequency ratio determinator may count the pulses from each oscillator over a time interval and/or determine the finger position from the ratio of the number of pulses counted from each oscillator. Measuring the ratio (i.e., a "ratio-metric" design) of the pulse counts results in the rejection of common-mode errors and drift that may be caused by, e.g., ambient temperature fluctuations, damage to the surface of the scrolling pad (caused, for example, by hand lotion or spilled beverages), finger size, and manufacturing tolerances.

According to another aspect of the present invention, the device may determine the relative pressure applied by the finger or other object according to the sum or average of the pulse counts from the two oscillators.

According to yet another aspect of the present invention, the conductors, which sense the finger or other object, may be of various shapes, preferably wedge-shaped such as triangular, and disposed in the touch pad of the device such that the finger covers both traces simultaneously when used properly. Moreover, more than two conductors may be used, such as by using multiple interdigitated conductors, to eliminate errors caused by the finger moving in a direction transverse to the intended axis of motion along the scrolling pad. By interdigitating the traces, potential errors caused when a finger is rolled in a direction transverse from movable axis can be minimized.

According to still another aspect of the present invention, the measuring portion may include a counting mechanism for counting the number of pulses generated by the oscillators. The counting mechanism may include a high frequency counter so that the pulses may be read quickly. This is helpful in reducing the effects of the environmental 60 Hz hum generated by the alternating current power source.

These and other features of the invention will be apparent upon consideration of the following detailed description of preferred embodiments. Although the invention has been defined using the appended claims, these claims are exemplary in that the invention is intended to include the elements and steps described herein in any combination or subcombination. Accordingly, there are any number of alternative combinations for defining the invention, which incorporate one or more elements from the specification, including the description, claims, and drawings, in various combinations or subcombinations. It will be apparent to those skilled in the relevant technology, in light of the present specification, that alternate combinations of aspects of the invention, either alone or in combination with one or more elements or steps defined herein, may be utilized as modifications or alterations of the invention or as part of the invention. It is intended that the written description of the invention contained herein covers all such modifications and alterations.

BRIEF DESCRIPTION OF THE DRAWINGS

The foregoing summary of the invention, as well as the following detailed description of preferred embodiments, is better understood when read in conjunction with the accompanying drawings, which are included by way of example, and not by way of limitation with regard to the claimed invention. In the accompanying drawings, the same reference number in different drawings refers to the same element.

FIGS. 5A, 5B, and 5C are a top view, a side view, and another top view, respectively, of an exemplary capacitance touch slider with a corresponding chart showing the number of pulse counts measured as compared with the pressure and position of a finger on the conductors of a capacitance touch slider.

DETAILED DESCRIPTION OF PREFERRED EMBODIMENTS

Figure 1A:
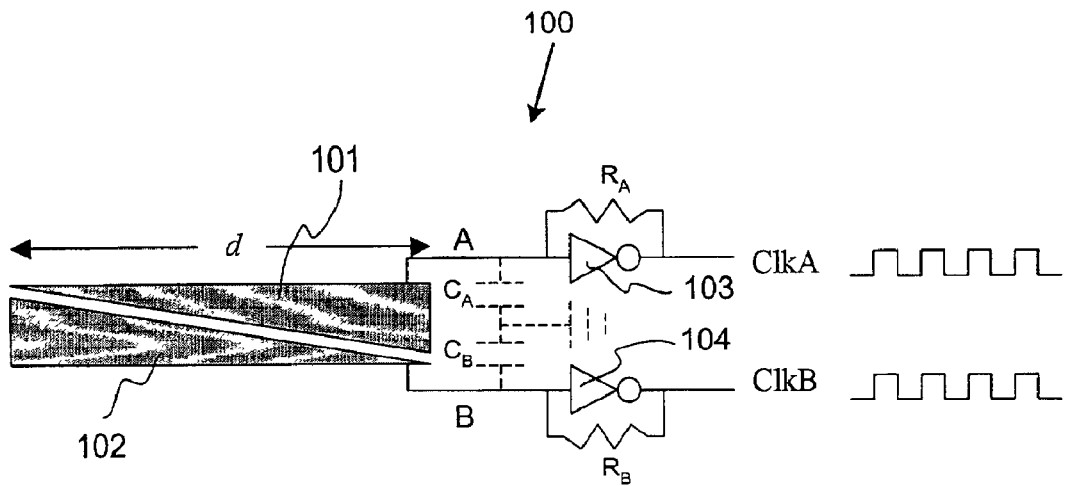
FIG. 1A is a schematic of an exemplary embodiment of a capacitance touch slider with two triangular conductors each having its own oscillator.

Referring to FIG. 1A, an exemplary embodiment of a capacitance touch slider 100 has two capacitive nodes such as conductive plates 101, 102. The conductive plates 101, 102 function to sense the position of, e.g., a human finger, along an axial direction d. As will be discussed below, the conductive plates 101, 102 may be variously shaped, although in the present example each of the conductive plates 101, 102 is triangular in shape.

To allow the position of the finger to be sensed, each conductive plate 101, 102 may be a capacitive part of a respective different oscillator. In the present embodiment, a first digital resistor-capacitor (RC) oscillator (hereafter called "oscillator A" in this embodiment) includes conductive plate 101 (which provides capacitance), a resistance $R_A$ such as from a simple resistor, and an inverter 103 preferably of the Schmitt type. Also, a second digital RC oscillator (hereafter called "oscillator B" in this embodiment) includes conductive plate 102 (which provides capacitance), a resistance $R_B$ such as from a simple resistor, and an inverter 104 preferably of the Schmitt type.

Inverters 103, 104 are preferably Schmitt inverters to ensure stability. However, any type of inverter may be used. Also, although simple digital oscillators are shown in this embodiment, any oscillator circuits may be used, whether they be digital or analog. For instance, a conventional analog RC oscillator circuit may be used in conjunction with an analog-to-digital converter (A/D converter) to produce an output similar to a digital oscillator circuit. In this regard, the term "pulse" as used herein refers to any type of periodic signal wave feature, such as a digital bit or a peak portion of an analog sine wave. The term "pulse" as used herein also encompasses a negative pulse or other negative wave feature.

Each of the two oscillators A and B generates a respective output signal ClkA and ClkB. The ClkA and ClkB signals each include a train of pulses with a frequency that depends upon the capacitance and resistance used in the respective oscillator. More particularly, the capacitance (represented as $C_A$) between conductive plate 101 and ground, along with $R_A$, determines the frequency of the pulses of ClkA. The capacitance (represented as $C_B$) between conductive plate 102 and ground, along with $R_B$, determines the frequency of the pulses of ClkB. Since the conductive plates 101, 102 are not rectangular in this embodiment, the amount of surface area between a human finger and each individual conductive plate 101, 102 varies depending upon the position of the finger along the axial direction d. This varying surface area thereby causes each of $C_A$ and $C_B$ to also vary depending upon the position of a human finger. In turn, the pulse frequencies of ClkA and ClkB also depend upon the position of the finger along the axial direction d.

Two oscillators are used in the present embodiment so that a ratio-metric output may be calculated to ensure a more stable measurement. Such a ratio-metric output is preferably the ratio between the frequencies $f_A$ of ClkA and $f_B$ of ClkB, such as $f_A/f_B$ or $f_B/f_A$. If desired, the ratio-metric output may be scaled, such as by multiplying the ratio-metric output by and/or summing it with another factor. Thus the ratio-metric output includes the ratio of two different pulse frequencies each dependent upon the position of the finger along d.

A significant advantage of such ratio-metric measurement is that common-mode errors are diminished if not fully removed. In an example, the user's finger is at a first position along the axial direction d and depressed with a first pressure against a thin insulating surface (not shown in FIG. 1) between the conductive plates 101, 102 and the finger. In such a case, signal ClkA would produce a pulse train with frequency $f_{A1}$ and signal ClkB would produce a pulse train with frequency $f_{B1}$, each frequency being dependent upon the surface area covered between the finger and the respective conductive plate 101, 102. A ratio-metric output would then be the ratio $f_{A1}/f_{B1}$ (or alternatively, $f_{B1}/f_{A1}$). The surface areas covered by the finger are dependent upon two factors: the position of the finger along axial direction d, and the pressure of the finger against the insulating surface. This is because the greater the pressure applied, the more the finger flattens to allow for more skin surface area to press against the insulating surface. Now assume that the finger location remains at the first location, but more pressure than the first pressure is applied by the finger. Now the surface area increases for both conductive plates 101, 102 thereby changing both $f_{A1}$ and $f_{B1}$ to new values of $f_{A2}$ and $f_{B2}$. Since both the numerator and the denominator of the ratio-metric output change in the same direction, the resultant change in the ratio-metric output is minimal. For instance, where $f_{A1}=100$ and $f_{B1}=75$, then the ratio $f_{A1}/f_{B1}=1.33$. Upon higher finger pressure, assume that $f_{A2}=120$ (an increase of 20%) and $f_{B2}=90$ (also an increase of 20%). The ratio-metric output now would still be 1.33, which has not changed at all. In reality, there would probably be some change in the ratio-metric output, however this change would be minimal. Thus, by using the ratio-metric measurement, the capacitance touch slider is relatively insensitive to pressure changes when measuring the position of the finger along the axial direction d. For any finger pressure dependency in the reported slider position, an appropriate pressure term may be factored in when computing the slider position to reduce the pressure effect.

By way of contrast, if a single conductive plate were used, the frequency of the signal generated by the single associated oscillator would be greatly determined not only by the finger position along d but also the pressure of the finger. For example, assume that the finger is at the first position at the first pressure such that the single output pulse train frequency is $f_1=100$. Now assume that the finger pressure has increased, but the finger is still at the first position, such that the frequency is now $f_2=120$ (a 20% increase). Now, since the frequency has changed by 20%, the position of the finger is difficult to measure unless the finger pressure is also known. This is because a change in finger position along the axial direction could also have produced the same 20% difference in output frequency. In other words, such a single-conductor design cannot distinguish between a change in finger position and a change in finger pressure.

Returning to the example where two conductive plates 101, 102 are used to produce ratio-metric measurements, both the finger position and the finger pressure may be independently determined and distinguished. In general, the finger pressure is related to the sum (or average) of the two frequencies from oscillator A and oscillator B. Thus, while finger position may be determined from the ratio $f_A/f_B$, finger pressure may be determined from the sum $f_A+f_B$. Thus, not only does ratio-metric measurement decrease sensitivity to common-mode errors such as increased pressure for both conductive plates 101, 102 but also allows the finger pressure to be determined independently from the finger position. The ability to sense both finger position and finger pressure is useful for many purposes such as in a system where the finger position controls a scrolling direction on a display screen and the finger pressure controls another factor such as scrolling speed.

Figure 2A:
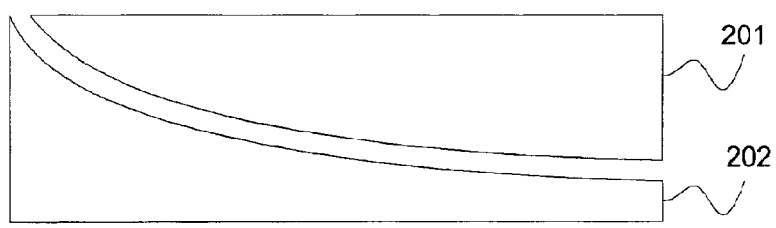
FIGS. 2A–2C are top views of various exemplary embodiments of conductors that may be used in a capacitance touch slider.
Figure 2B:
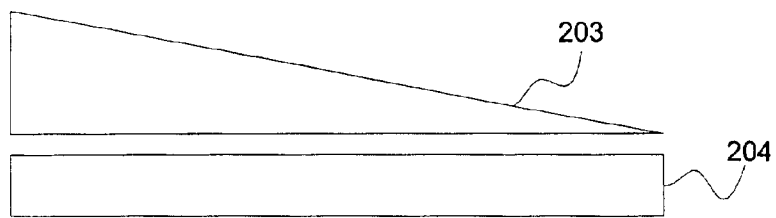

The conductive plates 101, 102 may be variously shaped, such as is shown in FIGS. 2A and 2B. In FIG. 2A, two exemplary conductive plates 201, 202 are of different shapes from one another, wherein both conductive plates 201, 201 have curved edges. However, any number of the conductive plates may have one or more curved edges. In another exemplary embodiment shown in FIG. 2B, two conductive plates 203, 204 are also of different shapes from one another, wherein conductive plate 203 is triangular and conductive plate 204 is rectangular. Thus, the conductive plates may be of the same shape or of different shapes as compared with one another.

Figure 2C:
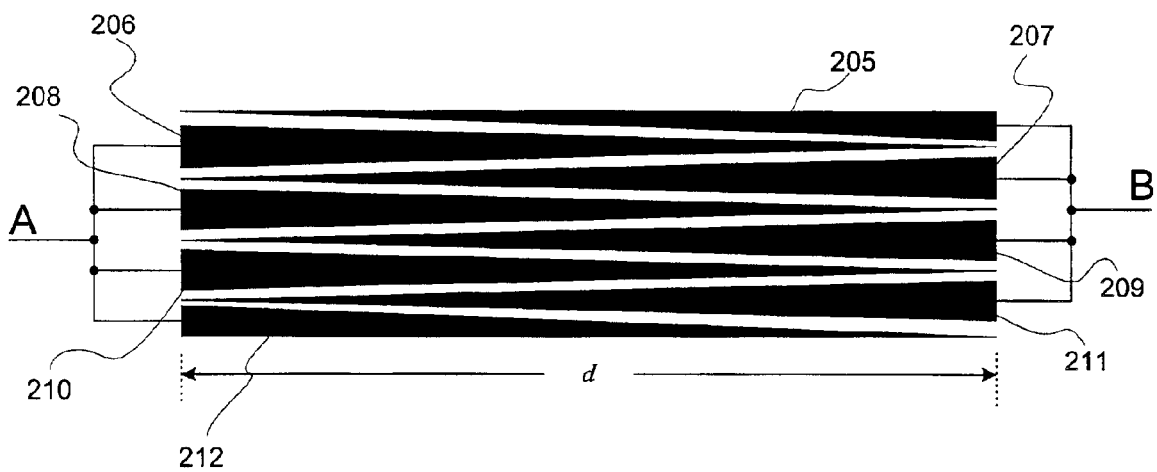

More than two conductive plates may be used, such as is shown in FIG. 2C. In this exemplary embodiment, multiple interdigitated plates 205–212 are used. For this embodiment, it is important that the relative amount of surface area proximate to the finger changes as the finger moves along the axial direction d. Thus, for instance, it would not be desirable to have both of the conductive plates rectangular like conductive plate 204 such that the surface area remains constant as the finger moves.

In other embodiments, three, four, five, six, seven, eight, nine, ten, or more interdigitated capacitive nodes may be used. Preferably, an even number of interdigitated capacitive nodes are used (e.g., eight) so that each oscillator has an equal number of conductors associated therewith. As shown in FIG. 2C, conductive plates 206, 208, 210, 212 ("group A") are coupled to a first node A and conductive plates 205, 207, 209, 211 ("group B") are coupled to a second node B. The group A capacitive nodes are interleaved, or interdigitated, with the group B capacitive nodes. As shown in FIG. 2C, the interleaved capacitive nodes may be adjacent to one another such that there are not other capacitive nodes disposed between the capacitive nodes of groups A and B. The nodes A and B of FIG. 2C correspond to the nodes A and B, respectively, of FIG. 1, which in turn correspond to the inputs of oscillators A and B, respectively, of FIG. 1. Thus, in the present embodiment, and as is shown in FIG. 2C, each of the conductive plates are interleaved and interdigitated with each other in the following order along a direction perpendicular to the axial direction: plate 205, then 206, then 207, then 208, then 209, then 210, then 211, and then 212.

An interdigitated arrangement solves the potential problem where, when only two conductive plates are used, movement of the finger in a non-axial direction (e.g., perpendicular to d) could cause a change in the ratio-metric output (since such a movement could cause a non-commonmodal error), even where there is no movement of the finger at all in the axial direction d. In other words, such an interdigitated configuration reduces the effect of non-axial movement of the finger such that the interdigitated configuration effectively sensed finger movement substantially only in the axial direction, while ignoring movement perpendicular to the axial direction.

For example, assume that the finger is disposed at a first position along the axial direction d and centered precisely over the group of conductive plates 205–212 in a direction perpendicular to the axial direction d. Now assume that the finger is moved perpendicular to the axial direction d while remaining at the same first position along the axial direction d. In the interdigitated embodiment shown in FIG. 2C, there would be minimal change in the ratio $f_A/f_B$ since the surface area defined by the group A capacitive nodes and the surface area defined by the group B capacitive nodes are spread over a larger interleaved area. The result is that the total surface area of the group A capacitive nodes that is covered by the finger, and the total surface area of the group B capacitive nodes that is covered by the finger, may both increase and decrease together, more or less. This means that the ratio $f_A/f_B$ is less affected by non-d-axial movement. All other factors being equal, the more interdigitated conductive plates that are used, the less sensitive is the device to non-d-axial movement. By way of contrast, in the embodiment shown in FIG. 1A, there would be comparatively more of a change in the ratio $f_A/f_B$ since the respective covered surface areas of the conductive plates 101, 102 would change much more noticeably and indeed in opposite directions.

In the circuit of FIG. 1A, the coupling from conductive plate 101 to conductive plate 102 and vice versa can cause cross-mode locking. In other words, the measurement taken from oscillator A can be affected by oscillator B, and vice versa. This problem is preferably eliminated by enabling only one oscillator at a time and simultaneously grounding or otherwise disabling the other. Thus, the frequencies of the ClkA and ClkB signals would each be determined over separate non-overlapping time intervals. The schematic diagram of FIG. 3A shows how signal diodes D1, D2 may be used to disable (e.g., ground) the non-enabled oscillator by attenuation.

Figure 1B:
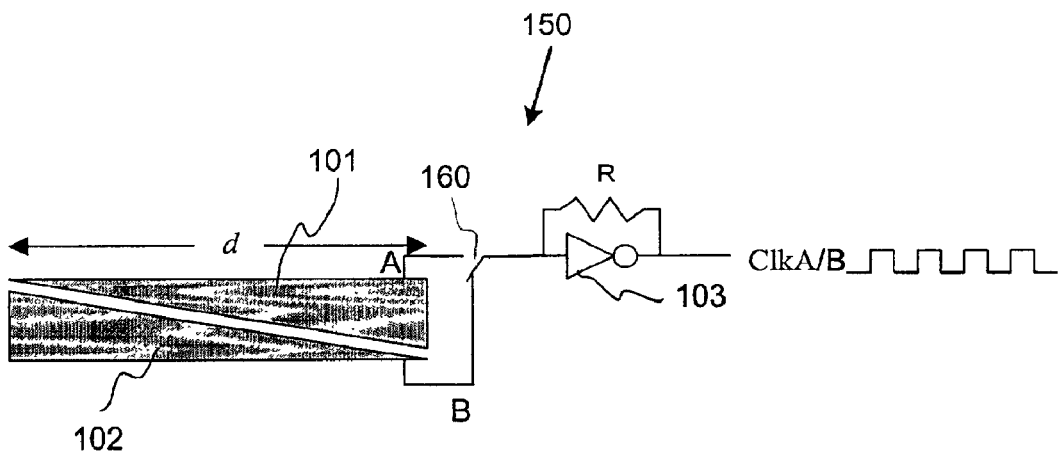
FIG. 1B is a schematic of another exemplary embodiment of a capacitance touch slider with two triangular conductors each sharing an oscillator via a switch.

In an alternative embodiment, a single oscillator may be analog switched between the two conductive plates, yielding frequency differences primarily from the conductive plate capacitances rather than from variations in parts. An example of such an embodiment 150 is shown in FIG. 1B, wherein a switch 160 is used to connect either the first or second conductive plates 101, 102 to the oscillator 103.

In a further embodiment, the touch slider may utilize other methods for determining the capacitance of the capacitive nodes (and thus the finger position) by, e.g., generating signals whose amplitudes (instead of frequencies) are related to the capacitances of the capacitive nodes. In such a case, the ratio of the amplitudes may be used instead of the ratio of the frequencies or the pulse counts. In further embodiments, a charge transfer method may be employed to determine the respective capacitances of the individual capacitive nodes.

Figures 3A, 3B:
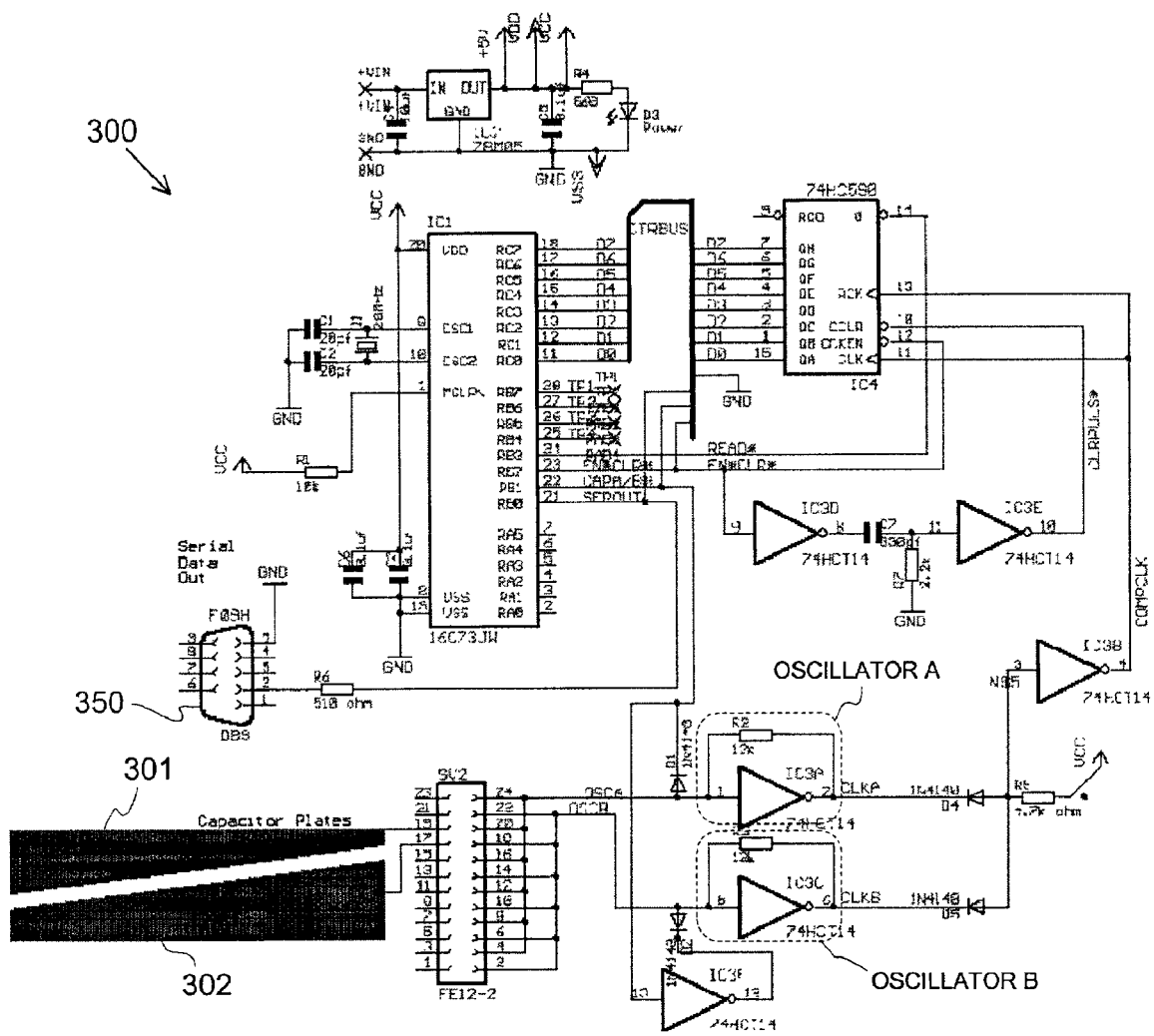
FIG. 3A is a schematic of another exemplary embodiment of a capacitance touch slider with two triangular conductors each having its own oscillator, along with circuitry for measuring and determining the position of a finger on the conductors.
FIG. 3B is a block diagram showing an exemplary embodiment of how the capacitance touch slider of FIG. 3A may be coupled with a personal computer or other device.
Figure 4:
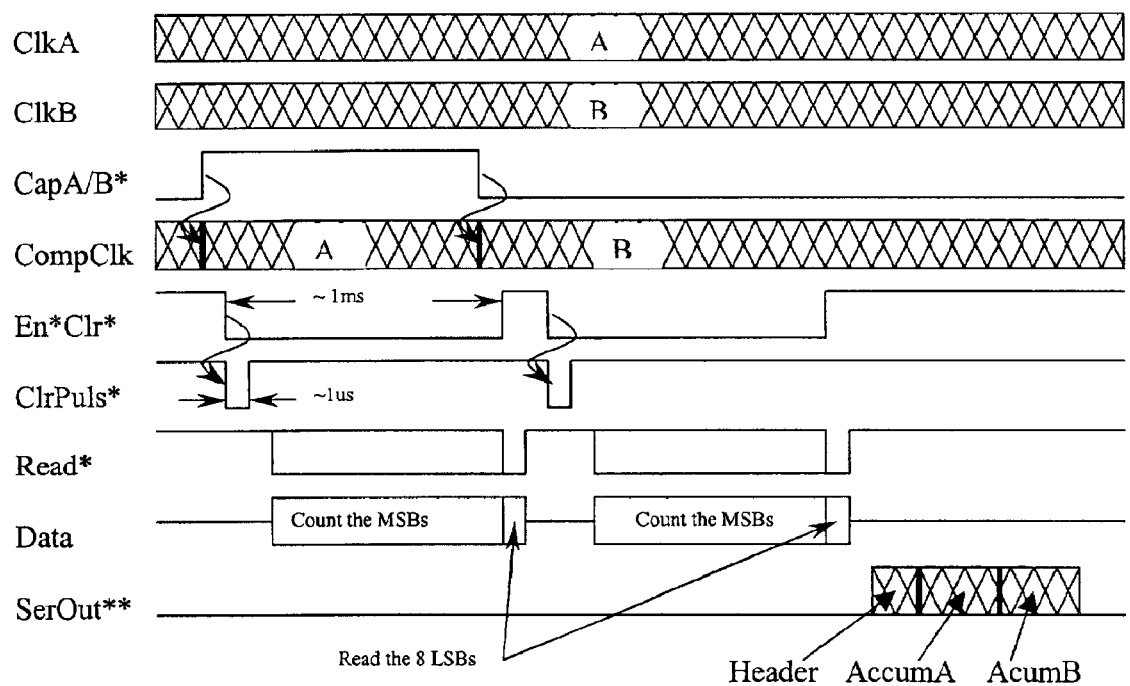
FIG. 4 is an exemplary timing diagram showing the various signals that may be generated in the circuitry of the capacitance touch slider of FIG. 3.

Referring to FIG. 3A, another exemplary capacitive touch slider 300 is shown. The circuit of FIG. 3A uses a processor such as an on-board PIC microprocessor IC1, wherein data is output via an interface port such as a 9600 baud serial port 350. FIG. 4 shows a timing diagram describing the relationship between various signals in the circuit of FIG. 3A.

The number of pulses of ClkA (the output of a first oscillator, which may preferably average about 2 MHz) is accumulated over a short interval (e.g., approximately 1 millisecond) while OscB is disabled. Immediately afterward, ClkB (the output of a second oscillator) is accumulated over another interval of the same length. Preferably, these two intervals are non-overlapping. The PIC microprocessor IC1 then derives a finger position which is a function of the ratio of accumulated ClkA and ClkB pulses. A kind of "pressure" indication may also be derived and used to determine the threshold for finger contact from the sum of accumulated pulses of ClkA and ClkB.

A voltage regulator such as a 78L05 device IC2 provides a regulated 5 volts for the circuit power. The PIC 16C73 CMOS microcontroller IC1 provides control signals, data read and serial output for operation. Schmitt inverters for the two oscillators and for other portions of the circuit may be embodied in a 74HCT14 device IC3, which is a CMOS hex Schmitt inverter. A counter may also be used, such as a 74HC590 device IC4, which is a CMOS 8 bit counter with output latches, output tristate enable, and a counter clear. Since this embodiment measures capacitances on the order of a few picofarads, it is preferable that the RC oscillators (74HCT14) be disposed near the PC traces.

Referring to the timing diagram of FIG. 4 in conjunction with the schematic diagram of FIG. 3A, during the count and read cycles, signal CapA/B* goes high to disable diode D1, thereby enabling RC oscillator A (comprising conductive plate 301, resistor R2, and Schmitt inverter IC3A, which is one of the inverters in hex inverter device IC3). Raising CapA/B* to high also disables RC oscillator B (comprising conductive plate 302, resistor R3, and Schmitt inverter IC3C, which is also part of inverter device IC3) by grounding its input through diode D2 using inverter IC3F (also one of the inverters of hex inverter device IC3). The CompClk signal reflects ClkA during this period. Next, the microprocessor IC1 asserts En*Clr*, which is the clock enable and clear signal. IC3D, IC3E, C7, and R7 together embody a falling edge pulse generator that provides a negative pulse (e.g., approximately 1 micro-second in length) to the Clr* pin of the counter IC4 on the leading edge or beginning of the count cycle. Thus, the counter IC4 starts counting from zero a few microseconds after the beginning of the count cycle. During this count period, the microprocessor IC1 enables a counter read by asserting Read* and counts the positive transitions of the most significant bit (MSB) D7. This allows an extension of the number of bits of the counter IC4. After a predetermined duration (e.g., 1 millisecond where a PIC microprocessor is used), the count cycle is terminated by causing En*Clr* to go high. The 8 bits of the counter IC4 are then read by the microprocessor IC1, combined with the number of low to high transitions of the MSB, and the result stored. CapA/B* is next negated to enable oscillator B (and also to ground oscillator A's input or otherwise disable oscillator A) and the count cycle repeated, accumulating the total count of ClkB.

It is possible that external noise may be present on the power pins to the hex Schmitt inverter IC1, which may cause small uncompensated variations in the processed output. Filtering beyond the usual bypass capacitor may accordingly be required. A temporary RC filter may be added to the power input pin of the 74HCT14 to correct this problem. Also, where an additional control signal is derived from the local microprocessor, the counter clear pulse generator may be eliminated. As for critical timing, reading the counter's D7 bit preferably should not begin until after more than 1 micro-second has passed after the leading edge of En*Clr* signal, due to the initial clearing of the counter with Clr-Puls*. With an approximately 2.5 MHz clock frequency (for example) for oscillators A and B, the pulse accumulation may be approximately 2,500 (over a 1 millisecond period) and may provide an observed count range of approximately 150 on each accumulator within the normal finger position range.

Once the counts are accumulated and read by the microprocessor IC1, the microprocessor IC1 may take a ratio of the counts, which entails either dividing the count of ClkA by the count of ClkB or vice versa. The microprocessor IC1 may further add the two counts together and/or average them. Data representing the ratio and/or the sum/average may then be sent via the SerOut line to the interface 350.

The count periods for both oscillators A and B, as well as the period between the count periods, may preferably be as short as possible to minimize any ambient 60 Hz interference (e.g., due to 60 Hz a-c power sources) that may be capacitively introduced through the finger. At 60 Hz, the period of the power source is ⅟₆₀ second, or about 16.7 milliseconds. Accordingly, in one embodiment, the total count cycle for both oscillators A and B takes about 2.25 milliseconds, which is substantially less than 16.7 milliseconds. Thus, the power signal does not change substantially during the entire count period, thereby reducing the ambient noise caused by the power signal. If it is desired to update at 60 Hz, the overhead for controlling and reading the touch slider may in this case be about 14%. In other embodiments, the count cycle for both oscillators A and B may take from about 0.5 millisecond to about 2 milliseconds, or less than about 5 milliseconds. In other countries, where another frequency of power source is used, the total count time for both oscillators A and B may be adjusted so as to be substantially less than the period of the power source. For instance, the total count time for both oscillators A and B may be less than about 15% of the power source period, or even less than about 10% of the power source period.

In an alternative embodiment, instead of using a counter the frequencies of ClkA and ClkB may be measured by other means, including by direct frequency measurement. In such a case, a ratio may be taken of the frequencies themselves, instead of the pulse count. However, the two resulting ratios are mathematically identical.

If it is desired to include additional touch buttons beyond the normal axial finger range, say for page up and page down, a trace consisting of only A or B capacitive input can be used under this area and uniquely identify this state from a normal finger slider position. FIGS. 5A–5C show an exemplary embodiment of such a device. In this embodiment, a 1.5 mm thick piece of LEXAN or other insulating material 550 may be milled or otherwise formed to provide a groove, such as an approximately 16 mm radius finger groove 553 that is about 8 mm wide and about 66 mm long. The depth of the finger groove 553 may be such that about a 0.5 mm wall thickness of insulating material 550 remains between the bottom of the finger groove 553 and the conducting plates 551. The insulating material 550 and the conductive plates 551 may be mounted on a substrate 552. Although the above dimensions are such that an average finger may comfortably fit in the finger groove 553, alternative dimensions may be used as desired. For instance, the groove may be about 30 to 50 mm long, or about 50 to 100 mm long. A shorter length may be desirable for use in a laptop, cellular phone, personal digital assistant, or other portable device.

Near or beyond each of the ends of the finger groove 553, depressions 560, 561 may be formed in the insulating material 550 to allow for access to buttons 501, 502. These button depressions 560, 561 may be of any shape such as round, oval, rectangular, or arrow-shaped. As in the case of the finger groove 553, the button depressions 560, 561 may also be formed in the insulating material such that only a thin amount of the insulating material remains between the finger and the conductive plates 551, such as about 0.5 millimeters of insulating material. In further embodiments, there may exist one or more button depressions that may be disposed anywhere near the finger groove, such as at the ends or along the lengthwise sides of the finger groove. The finger groove 553, depressions 560, 561, and/or the buttons 501, 502 may be used in conjunction with any of the other features and embodiments of the present invention.

Referring to FIG. 3B, the touch slider 300 may be coupled to another device such as a personal computer 370 via an interface such as the serial port 350 and a cable 371 connected to the interface. In this way, the personal computer 370 may receive the data representing the ratio, sum, and/or average of the counts as determined by the microprocessor IC1. The personal computer 370 may then use the data to control various features, such as to control the amount of scrolling on a display. Also, portions of the touch slider 300 may be in the personal computer 370, such as the microprocessor IC1. The connection between the touch slider 300 and the personal computer 370 may be wired or wireless, e.g., radio frequency or infrared. Where the connection is wired, it may be by any system such as a serial or parallel cable connection. The touch slider 300 may be a separate physical unit from the personal computer 370 or incorporated into the personal computer 370 such as being an integral part of the keyboard or mouse of the personal computer 370. Although a personal computer 370 is shown, any device may be coupled to or integrated with the touch slider 300 such as a laptop computer, a household appliance, a cellular phone, a desktop phone, a radio or stereo system, a personal digital assistant, an automobile control panel, and/or any other electrical and/or mechanical device in which a touch slider type user interface would be desirable.

Table 1 below shows the accumulated or counted values for ClkA and ClkB under different finger pressures and different finger positions P1–P5 along the axial direction of the finger groove as actually measured from a prototype of the embodiment of FIG. 3A. Table 1 below also shows the ratio-metric measurement $f_A/f_B$ as well as the sum $f_A+f_B$ for each instance. Note that the differences between ClkA and ClkB under the "No Finger Pressure" column is likely due to the connection lengths between each of the conductors and their respective oscillator being slightly different. If desired, this effect can be reduced by making the connection lengths the same between all capacitive nodes and their respective oscillators. The effect of connection length differences may also be reduced by compensating one or both measured frequencies during processing with terms derived during the calibration phase mentioned below.

be determined by the sum of the pulse counts or, still better, by both the sum and ratio.

A lookup table or database may be stored in a memory (for instance, coupled to the microprocessor IC1 in FIG. 3A, or as part of the personal computer 370 in FIG. 3B) that contains data associating sample finger positions along the touch slider with expected sums and ratios of the pulse counts. For instance, where the touch slider generates a ratio of about 1.19 and a sum of about 5095, then it may be determined with great confidence that the finger is located at about position P2 and is pressing with light pressure. Such a table may be similar to Table 1. Although Table 1 contains only 5 sample position points P1–P5, a table may include any number of sample position points, such as between fifty and one hundred positions or more, for greater accuracy. Such a table may further include more than two variations in pressure amount, such as five different pressures. Interpolation may also be used to determine expected ratio and sum values for points in between those contained in the table or database. For instance, referring to Table 1, where the measured ratio and sum equal 1.16 and 5071, respectively, it may be determined through linear interpolation that the position is halfway between P2 and P3 with light pressure.

In further embodiments, the touch slider may enter a calibration phase utilizing known auto-calibration features such as a leaky integrator. Also, the touch slider may default at power-up to the assumption that no touch is being applied by a finger anywhere on the finger groove. Where the microprocessor stores peak values of ClkA and ClkB over some time period (e.g., approximately 30 minutes), a continuous or periodic calibration may be realized. In such a configuration, it may be reasonably assumed that sometime during this time period no finger was present. In the present embodiment, the values of ClkA and ClkB would peak at the moment that no finger was present. In this way, the zero-finger-pressure ClkA and ClkB values may be continuously regenerated during touch slider use.

Further techniques may be implemented to reduce any remaining effects of finger pressure on the reported finger position along the touch slider. Such techniques may preferably compensate for the effects of finger pressure in real time. An example of such a technique is as follows. In this exemplary embodiment, the following constants may be defined:

TABLE 1

| Position | No Pressure | | | | Light Pressure | | | | Heavy Pressure | | | |
|---|---|---|---|---|---|---|---|---|---|---|---|---|
| | A | B | ratio | sum | A | B | ratio | sum | A | B | ratio | sum |
| P1 | 2810 | 2494 | 1.13 | 5304 | 2805 | 2120 | 1.33 | 4925 | 2490 | 2037 | 1.22 | 4527 |
| P2 | 2810 | 2494 | 1.13 | 5304 | 2765 | 2330 | 1.19 | 5095 | 2741 | 2302 | 1.19 | 5043 |
| P3 | 2810 | 2494 | 1.13 | 5304 | 2672 | 2375 | 1.13 | 5047 | 2642 | 2356 | 1.12 | 4998 |
| P4 | 2810 | 2494 | 1.13 | 5304 | 2645 | 2462 | 1.07 | 5107 | 2589 | 2430 | 1.07 | 5019 |
| P5 | 2810 | 2494 | 1.13 | 5304 | 2370 | 2480 | 0.956 | 4850 | 2230 | 2455 | 0.908 | 4685 |

As can be seen from Table 1, the ratio-metric measurement varies depending upon finger position, but is not much affected by changes in finger pressure. For example, at position P3, the ratio-metric measurement is 1.13 at light pressure and 1.12 at heavy pressure, and at position P4, the ratio-metric measurement remains a constant 1.07. The sum of the pulse counts, however, does change dramatically depending upon pressure. For example, at position P3, the sum is 5047 at light pressure and 4998 at heavy pressure, and at P4 the sum is 5107 at light pressure and 5019 at heavy pressure. Thus, the finger position can accurately be determined by the ratio of the pulse counts, and the pressure can

| | | |
|---|---|---|
| TouchThreshold | => | The fraction of SumMax at which to assume finger is present (in this embodiment, Sum decreases as finger pressure increases). |
| PressureFactor | => | A factor (a function of Pressure) to include in SlideValue calculation to compensate for variations in finger pressure. Without this, SlideValue will make the apparent finger position move further away from midpoint with increasing finger pressure. |

The following calibration values may be determined at startup/power-up of the touch slider, during an explicit calibration phase, or constantly during use:
SumMax=ClkA+ClkB with no finger present
RatioMax=Ratio with finger in top-most finger position of slider
RatioMin=Ratio with finger in bottom-most finger position of slider
MidSliderValue=value of RawSlideValue with finger at midpoint of slider probably a constant)
Using the above calculations, the following algorithm may be implemented in the following order during use of the touch slider:

| | |
|---|---|
| (get ClkA and ClkB oscillator count values) | |
| Sum = ClkA + ClkB | : sum of slider values gets smaller as finger pressure increases |
| Pressure = SumMax − Sum | : Pressure as a function of Sum, usually 0 < Pressure < 2000 |
| Ratio = ClkA/ClkB | : Take ratio of Slider values |
| RawSlideValue = (Ratio − RatioMin)/ (RatioMax − RatioMin) | : 0 <RawSlideValue < 1 for slider area only, not including end buttons. |
| SlideValue = RawSlideValue − (Pressure * PressureFactor * (RawSlideValue − MidSliderValue)) | : pressure compensation |
| IF Sum < (SumMax * TouchThreshold) THEN    TouchFlag = 1 | : is slider touched? : slider is touched |
| ELSE    TouchFlag = 0 ENDIF | : slider is not touched |
| IF PreviousTouchFlag = 0 and TouchFlag=1 then    InitialTouchFlag = 1 ENDIF | : detect an initial touch |

Thus, using the above technique, which may be repeated in real time, any interaction between finger pressure and finger location as determined by the touch slider may be further reduced. Of course, the above technique is only exemplary, and variations on this technique may be implemented without departing from the scope of the invention.

The conductors 101, 102, 201–212, 301, 302 may be embodied as conductive plates, foils, layers, sheets, or members, and/or may be etched as tracings on a circuit board or other substrate. The conductors may be made of any suitable conductive material such as metal. The conductors preferably may be covered, coated, or encased with a thin plastic or other insulating material for protection of the conductors from a human finger or contact with other elements. Preferably the insulating material should be thin enough at the area defined by the conductors such that the finger position may be sensed. For instance, as discussed above, the insulating material may be LEXAN or any other insulating material and may be between approximately 0.001 to 0.01 mm thick, approximately 0.01 to 0.1 mm thick, approximately 0.1 to 0.5 mm thick, or approximately 0.5 to 1 mm thick, over the area defined by the capacitive nodes. The insulating material may be formed from a strong non-flexible material or may be a flexible material in the form of a sheet or layer. The finger groove and/or insulating layer may be directly incorporated into the shell or housing material of a device such as a keyboard or mouse. Further, although finger grooves are preferable and are discussed herein as to certain exemplary embodiments, a finger groove is not necessary in all aspects of the present invention.

In further exemplary embodiments, the touch slider may be of any size. For instance, the touch slider may be of a size suitable for a finger to slide along. At the other extreme, the touch slider may be of a much larger size, such as large enough for a human hand to slide along. Such a larger configuration may be, e.g., 6 foot by 3 foot and/or incorporated into a table such as by being mounted on the underside surface of a table, thereby being configured to sense the presence and 1-dimensional position of a hand lying on or closely above the table. Larger configurations may use the same or similar algorithms as discussed herein but may require different oscillator hardware values depending upon the size. As another example, the touch slider may even be of such size as to detect the location of a person or other object within a room or other similar area. Such a touch slider may be incorporated into the floor of a room to detect the presence and position of persons walking within the room. Accordingly, the term "pointing member" as used herein may, as is appropriate for the particular configuration and size of the touch slider, include objects larger than a human finger, such as a human hand, a human body, and/or other small or large object.

While exemplary systems and methods embodying the present invention are shown by way of example, it will be understood, of course, that the invention is not limited to these embodiments. Modifications may be made by those skilled in the art, particularly in light of the foregoing teachings. For example, each of the elements of the aforementioned embodiments may be utilized alone or in combination with elements of the other embodiments.

What is claimed is:

1. A device for measuring a position of a pointing member, comprising:
    a first oscillator including a first capacitive node having a first capacitance depending upon the position of the pointing member relative to the first capacitive node, the first oscillator generating a first signal having a first frequency depending upon the first capacitance;
    a second oscillator including a second capacitive node having a second capacitance depending upon the position of the pointing member relative to the second capacitive node, the second oscillator generating a second signal having a second frequency depending upon the second capacitance; and
    a frequency ratio determinator determining first and second characteristics associated with the first and second frequencies, respectively, and determining a ratio of the first and second characteristics.

2. The device of claim 1, wherein the frequency ratio determinator includes a counter configured to count a number of pulses in the first and second signals over a certain time interval in order to determine the first and second frequencies, the first characteristic being the number of pulses over the time interval in the first signal, the second characteristic being the number of pulses over the time interval in the second signal.

3. The device of claim 1, wherein the frequency ratio determinator is configured to measure the first and second frequencies directly, the first and second characteristics being the first and second frequencies, respectively.

4. The device of claim 1, wherein the first and second capacitive nodes each comprises a conductive plate.

5. The device of claim 1, wherein the first and second capacitive nodes each comprises an etched conductive tracing on a substrate.

6. The device of claim 2, wherein the first and second oscillators are each configured to be disabled while the other oscillator is enabled, and wherein the counter is configured to count the number of pulses in the first signal over a first time interval and the number of pulses in the second signal over a second non-overlapping time interval.

7. The device of claim 2, wherein the counter is configured to count the number of pulses in the first and second signals over a time interval that is substantially less than a period of ambient alternating current power.

8. The device of claim 2, wherein the frequency ratio determinator is further configured to determine a sum of the pulses counted from both the first and second signals, thereby allowing a pressure of the pointing member to be determined.

9. The device of claim 1, further including an interface configured to send data representing the ratio of the first and second frequencies to another device.

10. The device of claim 1, wherein the first oscillator further includes a third capacitive node and the second oscillator further includes a fourth capacitive node, the first, second, third, and fourth capacitive nodes being interdigitated with each other.

11. A method for measuring a position of a pointing member, comprising the steps of:
  determining a first capacitance of a first capacitive node, the first capacitance depending upon the position of the pointing member;
  determining a second capacitance of a second capacitive node, the second capacitance depending upon the position of the pointing member;
  generating a first signal having a first frequency depending upon the first capacitance;
  generating a second signal having a second frequency depending upon the second capacitance;
  counting a number of pulses over a certain time interval from each of the first and second signals; and
  determining a ratio corresponding to a ratio of the first and second frequencies, the position of the pointing member being indicated by the determined ratio, wherein the step of determining the ratio includes determining the ratio as being a ratio of the number of pulses counted from the first signal and the number of pulses counted from the second signal.

12. The method of claim 11, wherein the step of counting includes counting the number of pulses of the first signal over a first time interval and counting the number of pulses of the second signal over a second non-overlapping time interval.

13. The method of claim 12, wherein the step of counting includes enabling a first oscillator that generates the first signal during the first time interval while disabling a second oscillator that generates the second signal, and then disabling the first oscillator while enabling the second oscillator during the second time interval.

14. A device for measuring a position of a pointing member relative to the device, comprising:
  a first capacitive node and a second capacitive node each commonly coupled to a first circuit node; and
  a third capacitive node and a fourth capacitive node each commonly coupled to a second circuit node,
  the first, second, third, and fourth capacitive nodes being disposed so as to be adjacent and interdigitated, wherein the pointing member interacts with at least one of the first, second, third, and fourth capacitive nodes,
  wherein the first circuit node is part of a first oscillator and the second circuit node is part of a second oscillator, the first oscillator generating a first signal with a frequency depending upon a combined capacitance of the first and second capacitive nodes, the second oscillator generating a second signal with a frequency depending upon a combined capacitance of the third and fourth capacitive node.

15. A device for measuring a position of a pointing member relative to the device only in a single dimension, comprising:
  a first capacitive node and a second capacitive node each commonly coupled to a first circuit node;
  a third capacitive node and a fourth capacitive node each commonly coupled to a second circuit node;
  an insulating material disposed over the first and second circuit nodes; and
  a groove formed in the insulating material and running axially in the single dimension,
  the first, second, third, and fourth capacitive nodes being disposed so as to be interdigitated, wherein the pointing member interacts with at least one of the first, second, third, and fourth capacitive nodes.

16. A device for measuring a position of a pointing member, comprising:
  a first oscillator including a first capacitive node, the first oscillator being configured to generate a first signal having a first characteristic depending upon the capacitance of the first capacitive node, the capacitance of the first node depending upon the position of the pointing member;
  a second oscillator including a second capacitive node, the second oscillator being configured to generate a second signal having a second characteristic depending upon the capacitance of the second capacitive node, the capacitance of the second node depending upon the position of the pointing member; and
  a processor configured to determine a ratio of the first and second characteristics.

17. The device of claim 16, further including an insulating material disposed over the first and second capacitive nodes.

18. The device of claim 17, wherein the insulating material has a groove running in an axial direction, the first and second capacitive nodes also extending in the axial direction.

* * * * *